United States Patent

[11] 3,634,629

[72] Inventor Franco De Marco
Milan, Italy
[21] Appl. No. 865,701
[22] Filed Oct. 13, 1969
[45] Patented Jan. 11, 1972
[73] Assignee Societa Italiana Telecommunicazioni Siemens S.p.A.
Milan, Italy
[32] Priority Oct. 14, 1968
[33] Italy
[31] 22468A/68

[54] LINE SELECTOR GIVING ACCESS TO PBX MULTIPLES

7 Claims, 1 Drawing Fig.

[52] U.S. Cl. ........ 179/18 HA
[51] Int. Cl. ........ H04q 3/28
[50] Field of Search ........ 179/18 HA

[56] References Cited

UNITED STATES PATENTS 3,059,057 10/1962 Lurk et al. ........ 179/18 HA

*Primary Examiner*—Kathleen H. Claffy
*Assistant Examiner*—Thomas W. Brown
*Attorney*—Karl F. Ross

ABSTRACT: A rotary selector with a test wiper scanning bank contacts connected partly to individual subscriber lines and partly to a PBX multiple cooperates with a line monitor which controls a switching matrix *PC* for selectively connecting the associated lines to two parallel AND-gates *N*, $E_1$ also receiving a discriminating signal directly from these lines. If the selected line is an individual subscriber line 1, 4, 100, one AND-gate *N* responds to actuate a relay *P* arresting the selector; if it is the first line 2 of a PBX multiple, a flip-flop *B* is set to operate that relay as soon as the wiper either reaches a free intermediate line *B* of the multiple, as determined by a further AND-gate $E_2$, or steps onto the last line 110 of the multiple as determined by yet another AND-gate $E_3$.

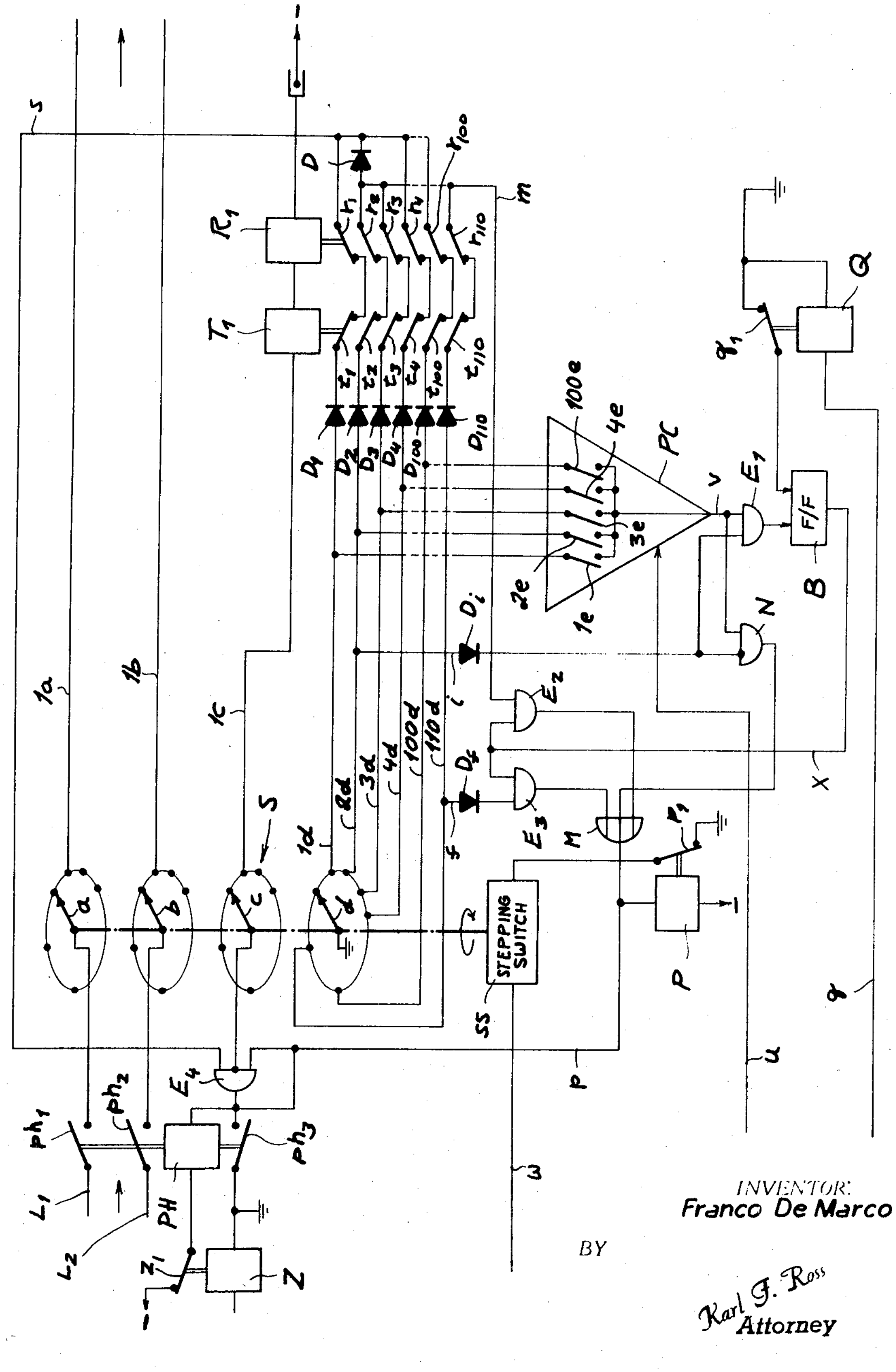
INVENTOR:
Franco De Marco
BY
Karl F. Ross
Attorney

LINE SELECTOR GIVING ACCESS TO PBX MULTIPLES

My present invention relates to a telecommunication system, such as a telephone exchange, wherein the arrival of a call over an incoming line marks an outgoing line identified by the caller and causes the actuation of a selector which successively explores the test wires of a multiplicity of outgoing lines until it reaches the line marked in response to the call signal. Depending on the free or busy state of the selected outgoing line, the caller is connected to it or receives a busy signal.

If the outgoing lines explored by the selector include a set of lines leading to a common destination, such as a multiple terminating at a private branch exchange PBX, means must be provided for letting the selector advance to a free line of the multiple if the first line or lines thereof are busy. If none of these lines is free, the selector is to stop on the last line of the multiple to cause the emission of a busy signal. It is also desirable, e.g., for use at night and other periods of light traffic, to allow for the direct selection of one or more lines of the multiple other than its first line whereupon the selector will stop on such line and complete the connection or cause the emission of the busy signal as with an individual subscriber line.

Prior systems designed to carry out these tasks have been relatively complex and not fully reliable in preventing the establishment of a false connection between a caller finding all the lines of the multiple busy and a user of that multiple trying to place an outgoing call. This is particularly true in telephone exchanges in which the associated subscriber lines are periodically monitored to determine their busy or idle state.

The general object of my present invention, therefore, is to provide an improved selector system for the purpose described which is simple in construction and reliable in operation.

A more specific object is to provide means in such system for enabling the use of a line multiple whose individual lines need not necessarily be connected to successive bank contacts of a conventional (e.g., rotary) selector but wherein one or more bank contacts connected to individual subscriber lines may be interspersed with the bank contacts assigned to the multiple.

In accordance with this invention, I provide a circuit—advantageously a logic network—discriminating between a call addressed to the first line of a multiple and calls addressed to any other of the lines served by a common selector, including subsequent lines of the same multiple. If a call signal identifies any line other than the first line of the multiple, it establishes one operating condition as soon as the selector reaches that line; if, on the other hand, the identified line reached by the selector is the first line of the multiple, another operating condition is generated. A bistable device of flip-flop responds to he latter condition to arrest the selector on any free line of the multiple, or on the last line thereof regardless of its free or busy condition.

As is well known in the telephone art, a switching matrix controlled by a decoder for an incoming call signal extends a marker circuit from the test wire of the selected outgoing line to a relay, or a combination of relays, whose energizing circuit is completed through a bus bar connected to all the test wires in parallel. If the selected line is busy, the continuity of this circuit is broken by the opening of a pair of normally closed interrupter contacts. In practice, two such pairs of contacts connected in series may be operated by a transmitting relay and a receiving relay to make the line busy on an outgoing or an incoming call, respectively. Pursuant to a more specific feature of my invention, the aforementioned flip-flop is jointly settable by the simultaneous appearance of operating potential on the aforementioned marker circuit and on a lead extending from the test wire of the first line of the multiple at a point ahead of the corresponding interrupter contacts, as determined by a first coincidence gate or AND circuit having respective inputs connected to that lead and to the output of the switching matrix; a second such coincidence gate is connected in parallel with the first one but includes or is preceded by an inverter so as to respond only when the first line of the multiple is unselected to actuate the selector-stopping relay. The same relay is also actuatable, in the set condition of the flip-flop, by operating potential on a lead extending from the test wire of the last line of the multiple (again at a point ahead of the corresponding interrupter contacts) or from the bus bar interconnecting the ends of all the test wires of the multiple, the latter bus bar being also connected to the remaining test wires if no line excluded from the multiple is interspersed with the lines of the multiple. In the case of such intercalation, however, separate bus bars are connected to terminations of the test wires of the multiple and to those of the test wires of individual lines, thereby excluding the possibility that the selector stops on a intercalated individual line after finding the preceding multiplied lines busy.

The above and other features of my invention will be described in greater detail hereinafter with reference to the accompanying drawing, the sole FIGURE of which diagrammatically illustrates a selector stage of a central office incorporating the present improvement.

As shown in the drawing, an incoming line with talking conductors $L_1$, $L_2$ is connectable to any one of a multiplicity of outgoing lines via a selector S shown to be of the rotary type. Selector S has four levels, represented by wipers *a*, *b*, *c* and *d* together with associated bank contacts, and can be unidirectionally advanced by a conventional stepping switch SS under the control of stepping pulses transmitted via a wire *w* from a generator not shown. The first outgoing line served by the selector S comprises a pair of talking conductors l*a* and l*b*, a third lead l*c* in circuit with the windings of a pair of busy relays $T_1$ (for transmission) and $R_1$ (for reception), and a test wire l*d*, all these leads originating at respective bank contacts engaged by wipers *a–d* in the No. 1 position of selector S. Of the remaining outgoing lines, only the test wires 2*d*, 3*d*, 4*d*, 100*d* and 110*d* of the lines reached, in the No. 2, No. 3, No. 4, No. 100 and No. 110 selector positions have been illustrated. These test wires include respective break contacts of the associated busy relays, i.e., contacts $t_1$, $r_1$ of relays $T_1$, $R_1$ in the case of wire l*d* and analogous contacts $t_2$ ... $t_{110}$, $r_2$...$r_{110}$of similar relays, not shown, in the case of the other test wires.

In the system shown in the drawing it is assumed that test wires 2*d*, 3*d*, 100*d* and 110*d* belong to outgoing lines forming part of a multiple which terminates at a PBX switchboard, the remaining test wires l*d*, 4*d* and 100*d* being associated with individual subscriber lines. These latter test wires are connected, via respective diodes $D_1$, $D_4$ and $D_{1000}$, to a bus bar *s* at a point beyond the busy contacts $t_1$, $r_1$ etc. Test wires 2*d*, 3*d* and 110*d* are connected by way of respective diodes $D_2$, $D_3$, $D_{110}$ to another bus bar *m* which is tied to bus bar *s* via a diode D.

A switching matrix PC is controllable via a lead *u* from a line-monitoring device, not shown, which detects the dial pulses of a calling subscriber to identify a called line by extending a marker circuit from the test wire of that line to an output lead *v*. Matrix PC may comprise the usual pyramidal array of binary switching stages here represented diagrammatically, for the sake of simplicity, by individual contacts l*e*, 2*e*, 3*e*, 4*e*,...100*e* respectively connected to wires l*d*–4*d* and 100*d*. The last test wire 110*d* of the multiple is not connected to this matrix, it being assumed that the corresponding line has no call number and cannot be specifically dialed by a calling subscriber, The multiple represented by test wires 2*d*–110*d* may, of course, include more than one line of this nonselectable type.

Output lead *v* of matrix PC terminates at respective inputs of a pair of AND-gates $E_1$ and N whose other inputs are connected in parallel to test wire 2*d* via a lead *i* including a diode $D_1$. The signal reaching the AND-gate N via this lead *i* is inverted, as conventionally indicated by a dot at the corresponding input, so that gate N has an output only when lead *v* is energized and lead *i* is not. Gate $E_1$, conductive upon concurrent energization of both leads *i* and *v*, has its output connected to the setting input of a flip-flop B which is normally reset by positive potential (ground) applied to its resetting input via an armature $q_1$ of a relay Q; the latter relay is normally deenergized, by way of a conductor $q$ originating at the line monitor of the exchange, to reset the flip-flop B upon the termination of a call and to condition it for setting, upon the conduction of gate $E_1$, only in response to an incoming call signal. The "set" output of flip-flop B is delivered through a conductor $x$ to respective inputs of two further AND-gates $E_2$ and $E_3$; AND-gate $E_2$ has another input connected to the bus bar $m$ whereas AND-gate $E_3$ has another input tied to test wire 110*d*, at a point ahead of interruptor contacts $t_{110}$ and $r_{110}$, by way of a lead $f$ including a diode $D_f$.

The outputs of AND-gates N, $E_2$ and $E_3$ are combined in an OR-gate M which, upon the conduction of any of these AND gates energizes via a lead $p$ a relay P as well as an input of a triple AND-gate $E_4$ having two further inputs respectively connected to bus bar $s$ and to wiper $c$; the latter input includes an inverter as again symbolized by a dot. Relay P has a break contact $p_1$ which, in its normal unoperated state, grounds the pulsing circuit of stepping switch SS so that selector S can be intermittently advanced in response to stepping pulses arriving over wire $w$.

The output of AND-gate $E_4$ serves to energize an ancillary relay PH having two make contacts $ph_1$, $ph_2$ in series with line conductors $L_1$, $L_2$ and a third make contact $ph_3$ in a holding circuit for relays P and PH.

Let us first consider the case of an incoming call intended for individual subscriber line represented by conductors l*a*–l*d*. The decoding of the corresponding dial pulses applies a command signal via wire $u$ to matrix PC for the closure of its switch contact l*e* whereby a marker circuit is extended from test wire l*d* to conductor $v$. The arrival of stepping pulses over wire $w$ advances the selector S until its grounded wiper $d$ engages the bank contact of wire l*d* to energize the relay P in a circuit traceable from ground on wire l*d* through switch contact l*e*, lead $v$, AND-gate N (which conducts inasmuch as test wire 2*d* is ungrounded) and OR-gate M to negative battery potential connected to the winding of that relay. The operation of relay P breaks the pulsing circuit of stepping switch SS so that the selector S comes to a halt. At the same time, wiper $c$ connects with lead 1*c* carrying negative battery voltage; because of the inverter at the corresponding input of gate $E_4$, this gate conducts if bus bar $s$ is grounded at that instant through the closed relay armatures $r_1$ and $t_1$ to indicate the idle state of the called line. Such conduction actuates the relay PH which, at armatures $ph_1$ and $ph_2$, connects the talking conductors $L_1$, $L_2$ of the calling line to the corresponding conductors l*a*, l*b* of the called line; at the same time, armature $ph_3$ supplies a holding ground to relays P and PH to maintain them after the operation of the busy relay $R_1$ in series with wiper $c$. The connection between the winding of relay PH and negative battery includes a further contact $z_1$ of a relay Z which is operated by the line monitor upon the termination of a call to release the relays P and PH preparatorily to a restarting of the selector.

The procedure described above corresponds, in essence, to the conventional method of arresting a selector on a line dialed by a calling subscriber.

Let us now assume that the caller wants to communicate with private branch exchange reached through the multiple represented by test wires 2*d*, 3*d*,...110*d*. For this purpose he dials the call number of the first line of the multiple, i.e., the one associated with test wire 2*d*, so that the decoder at the exchange closes the switch 2*e* in matrix PC whereby wire 2*d* is connected to lead $v$. As soon as the selector S stops on its No. 2 bank contacts, AND-gate $E_1$ conducts owing to the simultaneous grounding of leads $i$ and $v$ by wiper $d$. This sets the flip-flop B so that lead $x$ receives positive potential (ground) to condition the AND-gates $E_2$ and $E_3$ for possible conduction. If the desired line No. 2 is free, i.e., of contacts $t_2$ and $r_2$ are closed, gate $E_2$ conducts immediately as the ground on lead 2*d* is extended to bus bar $m$. The resulting energization of the output lead $p$ of OR-gate M again brings on the relays P and PH to stop the selector S as described above; the ground on bus bar $m$ is extended to bus bar $s$ via diode D. If the line is busy, selector S is not arrested and wiper $d$ advances onto its No. 3 bank contact to ground to test wire 3*d* associated with the second line of the multiple. If that line is free, bus bar $m$ is grounded to actuate the relays P and PH: if it is busy, the selector continues rotating until it finds a free line of the multiple. It should be noted that wiper $d$ will not stop on its No. 4 bank contact even if contacts $t_4$ and $r_4$ are closed, i.e., if the associated line is free, since that line is excluded from the multiple in view of the fact that wire 4*d* terminates at bus bar $s$ rather than bus bar $m$. The grounding of bus bar $s$ in the No. 4 selector position has no effect since diode D keeps that ground from the bus bar $m$ so that, with none of AND-gates N, $E_2$ and $E_3$ conductive, OR-gate M and AND-Gate $E_4$ remain cut off whereby relays P and PH remain unoperated, The same is true for the individual subscriber line associated with test wire 100*d* whose bank contact is also interleaved with the bank contacts assigned to the test wires of the multiple. If, after finding all the preceding lines of the multiple busy, wiper $d$ steps onto its No. *110* bank contact to ground the test wire 110*d* associated with the last line of the multiple, AND-gate $E_3$ conducts regardless of the free or busy state of that line. The ground on leads $f$ and $x$ thereupon traverses the OR-gate M to actuate the relays P and PH so that the selector S is stopped and the caller is connected through or receives a busy signal as the case may be.

Upon the subsequent operation of release relay Q by the deenergization of lead $q$, flip-flop B is reset and the selector S may again connect the incoming line $L_1$, $L_2$ to any outgoing line served by it.

If desired, the selector S may also serve additional multiples if the flip-flop B and the discriminating circuit N, $E_1$ as well as the gates $E_2$, $E_3$ and M are duplicated for each of these multiples. If the bank contacts of a multiple are not interleaved with those assigned to lines foreign to that multiple, a separate bus bar $m$ for the corresponding test wires will not be needed and all these test wires may be connected to the common bus bar $s$; to the same effect, diode D could be short circuited by a jumper placed thereacross.

Particularly where the multiple encompasses only a small number of lines, the inverting AND-gate N and the noninverting AND-gate $E_1$ could be interchanged, with lead $i$ connected in parallel (via respective isolating diodes $D_i$ ) to all the test wires other than the wire 2*d* associated with the first line of the multiple. The operation of such a modified system would be the same as that of the arrangement specifically disclosed, with generation of one operating condition (direct energization of lead $p$) upon engagement of wiper $d$ with any bank contact other than the one connected to test wire 2*d* and with generation of another operating condition (setting of flip-flop B) upon engagement of the No. 2 bank contact by that wiper.

Line No. 3, forming part of the multiple shown in the drawing, may be dialed directly with consequent closure of switch 3*e* whereupon the wiper $d$ stops on the No. 3 bank contact to ground the test wire 3*d* of that line, as with an individual subscriber line. Line No. 110 (the last one of the multiple), on the other hand, cannot be dialed; this is not essential for the operation of the system but is advantageous in preventing a selector stopped on that line from making busy a line that might otherwise be accessible to another caller or available for outgoing calls.

I claim:

1. A telecommunication system comprising an incoming line, a multiplicity of outgoing lines provided with respective test wires, selector means connected to said incoming line, stepping means, operable in response to an incoming call signal to advance said selector means for connecting said incoming line to any available one of said outgoing lines successively scanning said test wires to determine the line identified by said call signal, switch means responsive to said call signal for extending a marker circuit from the test wire of the outgoing line thus identified, some of said outgoing lines constituting a multiple leading to a common destination, discriminator means connected to certain of said test wires and to said marker circuit for energization by said switch means to generate one operating condition upon said selector means reaching a called line which is not the first line of said multiple and to generate another operating condition upon said selector means reaching said first lines thus identified, bistable means connected to the output of said discriminator means for switchover from a normal state to an off-normal state in response to said other operating condition, relay means actuatable by the output of said discriminator means in response to said one operating condition for deactivating said stepping means to arrest said selector means on any free outgoing line other than said first line identified by said call signal, and circuit means jointly energizable by said bistable means in said off-normal state and by any free line of said multiple for actuating said relay means to arrest said selector means on such free line.

2. The system defined in claim 1, further including additional circuitry connected to the test wire of the last line of said multiple and to said bistable means for energization thereby in said off-normal state to actuate said relay means for invariably arresting said selector means on said last line upon preceding identification of said first line by said call signal and in the absence of any free line of said multiple ahead of said last line.

3. The system defined in claim 2 wherein said test wires have series contacts closed in the free state of their lines, said discriminator means comprising a lead extending from the test wire of said first line ahead of said series contacts thereof, a first and second coincidence gate each having one input connected to said lead and another input connected to said marker circuit, and a signal inverter connected between said lead and said one input of said second gate whereby the latter conducts upon the establishment of a current path via said selector means and a test wire other than that of said first line through said marker circuit, said first gate conducting upon the establishment of a corresponding current path via the test wire of said first line, said bistable means having a setting input connected to the output of said first gate, said relay means being provided with a first operating circuit connected to the output of said second gate, said circuit means including a third coincidence gate in a second operating circuit for said relay means having one input connected to the output of said bistable means and having another input connected to the test wires of all the lines of said multiple beyond said series contacts thereof, said additional circuitry including a fourth coincidence gate in a third operating circuit for said relay means having one input connected to the output of said bistable means and having another input connected to the test wire of said last line ahead of said series contacts thereof, said additional circuitry including a fourth coincidence gate in a third operating circuit for said relay means having one input connected to the output of said bistable means and having another input connected to the test wire of said last line ahead of said series contacts thereof.

4. The system defined in claim 3 wherein said relay means comprises a main relay and an ancillary relay having respective energizing circuits connected in parallel to said first, second and third operating circuits, the energizing circuit of said ancillary relay further including a fifth coincidence gate with an additional input connected to the test wires of all outgoing lines beyond said series contacts thereof to actuate said ancillary relay upon the arresting of said selector means on any free line to complete the connection between such free line and said incoming line.

5. The combination defined in claim 4 wherein said selector means comprises a wiper arm and a multiplicity of bank contacts connected to respective test wires and successively engageable by said arm, said multiplicity of bank contacts including at least one bank contact connected to the test wire of at least on line excluded from said multiple, the remaining bank contacts forming a group connected to the test wires of said multiple, all the test wires of said multiple being connected via a first bus bar to said other input of said third gate and to said additional input of said fifth gate, the test wires of all lines excluded from said multiple being effectively connected via a second bus bar to said additional input of said fifth gate only.

6. The combination defined in claim 5, further comprising diode means connecting said first bus bar to said additional input of said fifth gate via said second bus bar.

7. The combination defined in claim 3 wherein said last line has no identifying call signal assigned to it, said switch means being inoperative to extend said marker circuit from the test wire of said last line.

* * * * *